US010113484B2

(12) United States Patent
Glessner et al.

(10) Patent No.: US 10,113,484 B2
(45) Date of Patent: Oct. 30, 2018

(54) HIGH PRESSURE EXHAUST MUFFLING DEVICE WITH MULTIPLE SOURCES

(71) Applicant: General Electric Company, Schenectady, NY (US)

(72) Inventors: John Carl Glessner, Kings Mills, OH (US); Jarrod Paul Sands, West Chester, OH (US)

(73) Assignee: General Electric Company, schenectady, NY (US)

( * ) Notice: Subject to any disclaimer, the term of this patent is extended or adjusted under 35 U.S.C. 154(b) by 373 days.

(21) Appl. No.: 14/976,094

(22) Filed: Dec. 21, 2015

(65) Prior Publication Data

US 2017/0175640 A1    Jun. 22, 2017

(51) Int. Cl.
| | | |
|---|---|---|
| *F02C 7/24* | (2006.01) | |
| *F02C 6/08* | (2006.01) | |
| *F02C 9/18* | (2006.01) | |
| *F02K 3/06* | (2006.01) | |
| *F04D 27/02* | (2006.01) | |

(52) U.S. Cl.
CPC ............... *F02C 7/24* (2013.01); *F02C 6/08* (2013.01); *F02C 9/18* (2013.01); *F02K 3/06* (2013.01); *F04D 27/0215* (2013.01); *F05D 2220/32* (2013.01); *F05D 2230/53* (2013.01); *F05D 2240/40* (2013.01); *F05D 2250/231* (2013.01); *F05D 2250/232* (2013.01); *F05D 2250/311* (2013.01); *F05D 2250/36* (2013.01); *F05D 2260/605* (2013.01); *F05D 2260/96* (2013.01); *Y02T 50/671* (2013.01)

(58) Field of Classification Search
CPC ...... F02K 1/46; F02K 3/06; F02C 7/24; F02C 9/18; F04D 27/0215
See application file for complete search history.

(56) References Cited

U.S. PATENT DOCUMENTS

| | | |
|---|---|---|
| 2,840,342 A | 6/1958 | Silvern |
| 3,327,476 A | 6/1967 | Rizk et al. |
| 3,500,642 A | 3/1970 | Foster-Pegg |
| 3,777,489 A | 12/1973 | Johnson et al. |
| 5,351,473 A | 10/1994 | Shuba |

(Continued)

OTHER PUBLICATIONS

Extended European Search Report and Opinion issued in connection with corresponding EP Application No. 16202886.4 dated May 2, 2017.

*Primary Examiner* — Craig Kim
(74) *Attorney, Agent, or Firm* — General Electric Company; Pamela Kachur

(57) ABSTRACT

A muffling device for exhausting at least one fluid flow in a gas turbine engine includes a first diffuser coupled in flow communication with a first conduit. The first diffuser is configured to exhaust a first fluid flow. The device further includes a second diffuser disposed adjacent the first diffuser. The second diffuser is coupled in flow communication with a second conduit. The second diffuser is configured to exhaust a second fluid flow. The device also includes a third diffuser at least partially surrounding the first diffuser and the second diffuser. The third diffuser is coupled in flow communication with the first diffuser and the second diffuser. The third diffuser includes a body with apertures and is configured to exhaust a third fluid flow. The third fluid flow includes at least one of the first fluid flow and the second fluid flow.

10 Claims, 5 Drawing Sheets

(56) References Cited

U.S. PATENT DOCUMENTS

| | | | |
|---|---|---|---|
| 7,451,855 B2 * | 11/2008 | Wang | E04B 1/8209 |
| | | | 181/198 |
| 7,797,945 B2 | 9/2010 | Appleby et al. | |
| 7,921,652 B2 | 4/2011 | Kirby et al. | |
| 8,307,943 B2 | 11/2012 | Klasing et al. | |
| 8,336,316 B2 | 12/2012 | Kirby | |
| 8,398,359 B2 | 3/2013 | Gallier et al. | |
| 8,418,717 B2 | 4/2013 | Pruthi et al. | |
| 8,430,202 B1 | 4/2013 | Mason et al. | |
| 8,511,095 B2 | 8/2013 | Mullender et al. | |
| 8,511,096 B1 | 8/2013 | Haugen et al. | |
| 8,516,827 B2 | 8/2013 | Kirby | |
| 8,550,208 B1 | 10/2013 | Potokar | |
| 8,590,308 B2 | 11/2013 | Kirby | |
| 8,925,330 B2 | 1/2015 | Britchford et al. | |
| 8,931,284 B2 | 1/2015 | Hussain et al. | |
| 9,109,467 B2 | 8/2015 | Dalsania et al. | |
| 2009/0320496 A1 * | 12/2009 | Faulder | F01D 25/305 |
| | | | 60/785 |
| 2015/0176500 A1 | 6/2015 | Taylor-Tibbott | |

* cited by examiner

HIGH PRESSURE EXHAUST MUFFLING DEVICE WITH MULTIPLE SOURCES

BACKGROUND

The field of the disclosure relates generally to gas turbine engines and, more particularly, to a muffling device for multiple bleed air flows in gas turbine engines.

At least some known gas turbine engines include bleed air systems which extract or bleed high-pressure air from the compressor for various needs. Bleed air is used for managing engine operability, such as combustion performance, as well as to provide turbine cooling, pressurized bearing sumps, purge air and/or provide aircraft environment control. The air is bled off from the compressor into the bleed air system using multiple bleed ports located over specific portions or stages of the compressor. The compressor, however, may pump more air than is required for the engine's needs, including the combustion process, creating excess bleed air.

In at least some known gas turbine engines the excess bleed air from the compressor is routed through the bleed air system and exhausted into a bypass flow. Because the pressure and temperature of the bleed air from the compressor may be very high, muffling devices at the bypass flow are needed to reduce the generated noise created from expelling the excess bleed air.

BRIEF DESCRIPTION

In one aspect, a muffling device for exhausting at least one fluid flow in a gas turbine engine is provided. The device includes a first diffuser is coupled in flow communication with a first conduit. The first diffuser includes a body including a plurality of apertures and is configured to exhaust a first fluid flow within the first conduit. The device further includes a second diffuser disposed adjacent the first diffuser. The second diffuser is coupled in flow communication with a second conduit. The second diffuser includes a body including a plurality of apertures and is configured to exhaust a second fluid flow within the second conduit. The device also includes a third diffuser at least partially surrounding the first diffuser and the second diffuser. The third diffuser is coupled in flow communication with the first diffuser and the second diffuser. The third diffuser includes a body including a plurality of apertures and is configured to exhaust a third fluid flow. The third fluid flow includes at least one of the first fluid flow exhausted from the first diffuser and the second fluid flow exhausted from the second diffuser.

In another aspect, a bleed system for exhausting bleed air from a multistage compressor in a gas turbine engine is provided. The system includes a first conduit coupled in flow communication with a first bleed location on the compressor such that a first fluid flow is directed within the first conduit. The system further includes a first diffuser coupled in flow communication with the first conduit. The first diffuser includes a body including a plurality of apertures and is configured to exhaust the first fluid flow. The system also includes a second conduit coupled in flow communication with a second bleed location on the compressor such that a second fluid flow is directed within the second conduit. Additionally, the system includes a second diffuser disposed adjacent the first diffuser. The second diffuser is coupled in flow communication with the second conduit. The second diffuser includes a body including a plurality of apertures and is configured to exhaust the second fluid flow within the second conduit. Moreover, the system includes a third diffuser disposed within a bypass duct and at least partially surrounding the first diffuser and the second diffuser. The third diffuser coupled in flow communication with the first diffuser and the second diffuser. The third diffuser includes a body including a plurality of apertures and is configured to exhaust a third fluid flow into a bypass flow within the bypass duct. The third fluid flow includes at least one of the first fluid flow exhausted from the first diffuser and the second fluid flow exhausted from the second diffuser.

In yet another aspect, a turbofan engine includes a core engine including a multistage compressor, a fan powered by a power turbine driven by gas generated in the core engine, and a bypass duct at least partially surrounding the core engine and the fan. The turbofan engine includes a bleed system for exhausting bleed air from the multistage compressor to the bypass duct. The bleed system includes a first conduit coupled in flow communication with a first bleed location on the compressor such that a first fluid flow is directed within the first conduit. The system also includes a second conduit coupled in flow communication with a second bleed location on the compressor such that a second fluid flow is directed within the second conduit. The system further includes a first diffuser coupled in flow communication with the first conduit. The first diffuser includes a body including a plurality of apertures and is configured to exhaust the first fluid flow. Additionally, the system includes a second diffuser disposed adjacent the first diffuser. The second diffuser is coupled in flow communication with the second conduit. The second diffuser includes a body including a plurality of apertures and is configured to exhaust the second fluid flow within the second conduit. Moreover, the system includes a third diffuser disposed within the bypass duct and at least partially surrounding the first diffuser and the second diffuser. The third diffuser coupled in flow communication with the first diffuser and the second diffuser. The third diffuser includes a body including a plurality of apertures and is configured to exhaust a third fluid flow into a bypass flow within the bypass duct. The third fluid flow includes at least one of the first fluid flow exhausted from the first diffuser and the second fluid flow exhausted from the second diffuser.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of the muffling devices described herein provide a cost effective method for exhausting multiple bleed air sources from a multistage compressor of a gas turbine engine. Specifically, the muffling devices and systems described herein allow for multiple bleed air sources to be exhausted at a single location in a bypass duct. The muffling device and system include three concentric diffusers disposed within the bypass duct. The diffusers are configured to induce high pressure drops and desirable flow properties in the exhausted bleed air. A first diffuser exhausts bleed air from a first compressor stage, and a second diffuser exhausts bleed air from a second compressor stage. A third diffuser surrounds the first and second diffusers and further exhausts the bleed air flow into the bypass duct. The muffling devices described herein offer advantages that include, without limitation, reduction of bleed air exhaust noise within the gas turbine engine, reduction of overall system weight while maintaining or improving engine performance, reduction of bypass air flow drag within the bypass duct, and reduction of part costs for the gas turbine engine.

Figure 1:
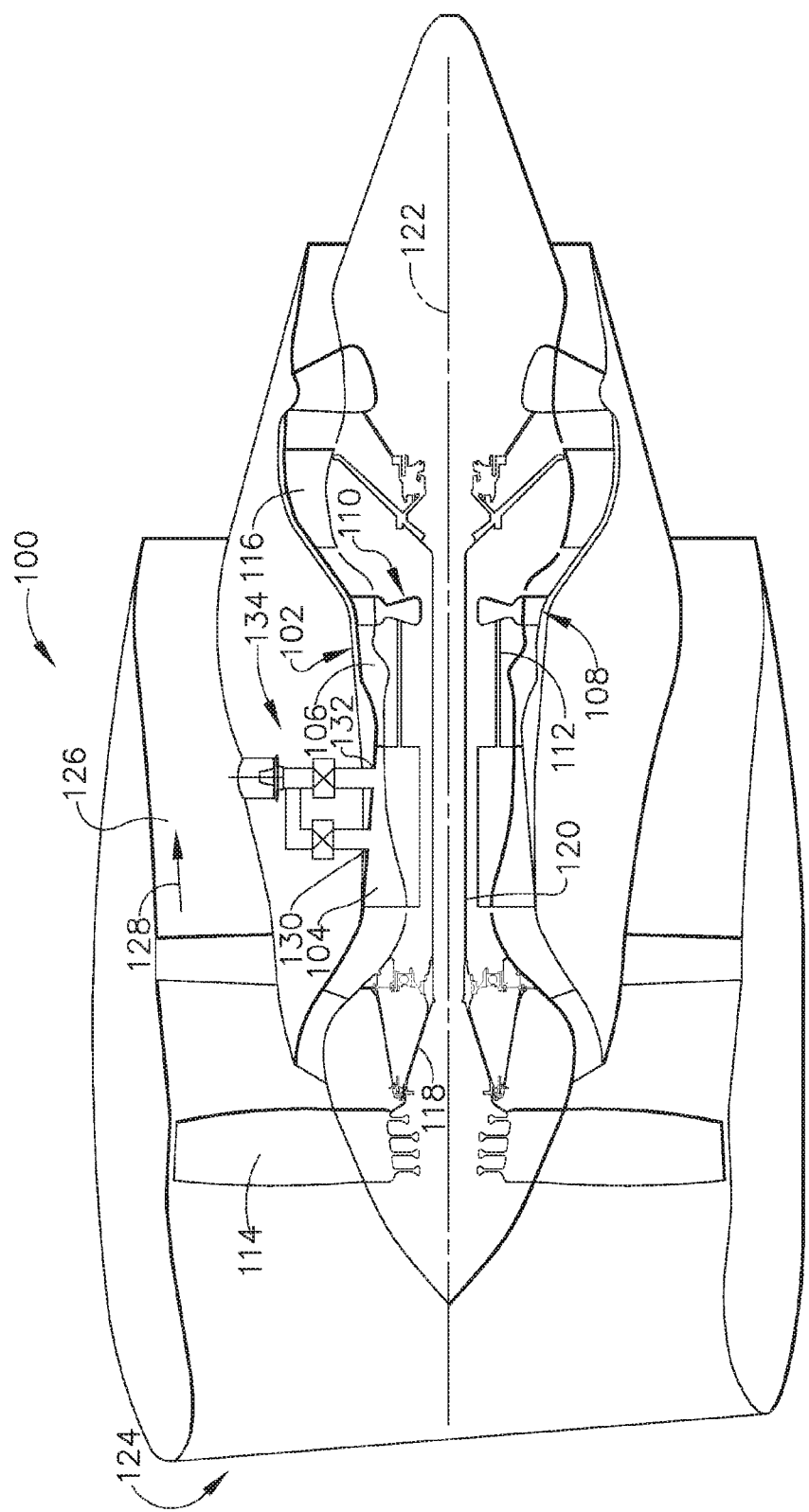
FIG. 1 is a schematic illustration of an exemplary gas turbine engine in accordance with an example embodiment of the present disclosure.

FIG. 1 is a schematic illustration of an exemplary gas turbine engine 100. Gas turbine engine 100 includes a gas generator or core engine 102 that includes a high pressure compressor 104, a combustor assembly 106, and a high pressure turbine 108 in an axial serial flow relationship on a core engine rotor 110 rotating about a core engine shaft 112. Gas turbine engine 100 also includes a low pressure compressor or fan 114 and a low pressure turbine 116 arranged in an axial flow relationship on a power engine rotor 118 rotating about a power engine shaft 120.

During operation, air flows along a central axis 122, and compressed air is supplied to high pressure compressor 104. The highly compressed air is delivered to combustor assembly 106. Exhaust gas flow (not shown) from combustor assembly 106 drives turbines 108 and 116, and turbine 116 drives fan or low pressure compressor 114 by way of shaft 120. Gas turbine engine 100 also includes a fan or low pressure containment case 124 including a bypass duct 126 that contains a bypass flow 128. At various operating conditions, a portion of the compressed air from high pressure compressor 104 is bled from a first compressor bleed location 130 and/or a second compressor bleed location 132. This bleed air is channeled through a compressor bleed system 134 and may be exhausted into bypass flow 128.

Figure 2:
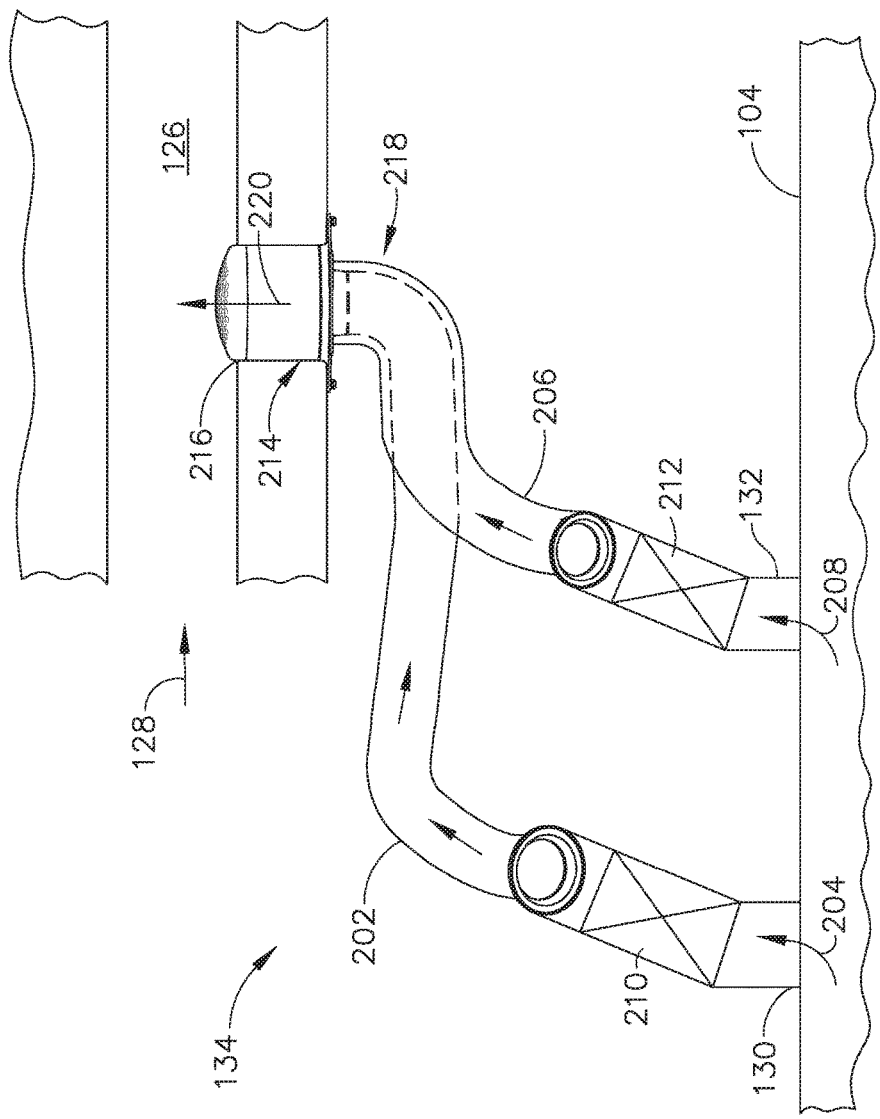
FIG. 2 is a schematic side view of an exemplary compressor bleed system shown in FIG. 1.

FIG. 2 is a schematic side view of bleed system 134 that may be used with gas turbine engine 100 (shown in FIG. 1). In the exemplary embodiment, a first bleed conduit 202 is coupled in flow communication with high pressure compressor 104 at first compressor bleed location 130 such that a first air flow 204 is directed within first conduit 202. Additionally, a second bleed conduit 206 is coupled in flow communication with high pressure compressor 104 at second compressor bleed location 132 such that a second air flow 208 is directed within second conduit 206. First air flow 204 through first conduit 202 is selectively controlled by a first bleed valve 210 and second air flow 208 through second conduit 206 is selectively controlled by a second bleed valve 212. In operation, first and second bleed valves 210 and 212 control first and second air flow 204 and 208, respectively, from high pressure compressor 104, to improve operability and performance of gas turbine engine 100 (shown in FIG. 1) such as during start and high throttle conditions. First and second air flows 204 and 208 from compressor 104 may be directed for use in other areas, such as, but not limited to internal engine cooling, anti-icing, and cabin pressurization, or first and second air flows 204 and 208 from compressor 104 may be exhausted into bypass duct 126. For example, first air flow 204 is bled from an eleventh stage of compressor 104 during transient conditions and second air flow 208 is bled from a seventh stage of compressor 104 during start and high throttle engine operating conditions. In alternative embodiments, air flow may be bled from a location on any stage of compressor 104.

First and second air flows 204 and 208 bled from high pressure compressor 104 have a high pressure and a high temperature, for example, bleed air pressure may be greater than approximately 1375 kilopascals (kPa) and the bleed air temperature may be greater than approximately 538° Celsius (C). Exhausting such high pressure air directly into bypass duct 126 is known to generate a large amount of noise, often exceeding acoustic limits for the engine during operation. In the exemplary embodiment, bleed system 134 includes a muffling device 214 to facilitate noise reduction of the exhausted first and second air flows 204 and 208. Muffling device 214 is configured to reduce the velocity of first and second air flows 204 and 208 at a single exhaust location 216 within bypass duct 126.

In the exemplary embodiment, muffling device 214 is configured to exhaust at least one of first air flow 204 and second air flow 208. First air flow 204 is at a different temperature and pressure than second air flow 208, e.g. bled from different compressor stages. Bleed system 134 is configured to maintain separation of first and second air flows 204 and 208 such that the higher pressure flow is restricted from blocking and/or back pressuring the lower pressure flow within first or second conduits 202 and 206. Muffling device 214 is coupled in flow communication with first conduit 202 and coupled in flow communication with second conduit 206. First conduit 202 maintains first air flow 204 and second conduit 206 maintains second air flow 208 such that first air flow 204 and second air flow 208 are separate and do not mix. When only one bleed flow is present, such as first air flow 204 or second air flow 208, first and second bleed valves 210 and 212 restrict the higher pressure flow from blocking and/or back pressuring the lower pressure flow within first or second conduits 202 and 206 respectively. In alternative embodiments, first air flow 204 and second air flow 208 are substantially similar temperature and pressure.

First and second conduits 202 and 206 are substantially circular conduits that reduce the loading stresses from the pressurized first and second air flows 204 and 208 respectively. Additionally, first and second conduits 202 and 206 are made from metal that is capable of withstanding first and second air flows 204 and 208 that are relatively high temperature and high pressure. In alternative embodiments, first and second conduits 202 and 206 are made from any other material that enabled operation of bleed system 134 to operate as described herein. Moreover, first and second conduits 202 and 206 couple together at a position 218 such that first and second air flows 204 and 208 exhaust at a single location 216. At position 218 second conduit 206 is disposed concentrically adjacent to first conduit 202 (shown in FIG. 4 and discussed below) such that the circular cross-sections are retained to reduce the loading stresses from the pressurized first and second air flows 204 and 208.

Muffling device 214, described in more detail below, is in flow communication with first and second conduits 202 and 206 such that first and second air flows 204 and 208 are discharged as a single exhaust flow 220 into bypass flow 128 within bypass duct 126, facilitating a reduction of the noise generated by mixing the higher pressure exhaust flow 220 and the lower pressure bypass flow 128.

Figure 3:
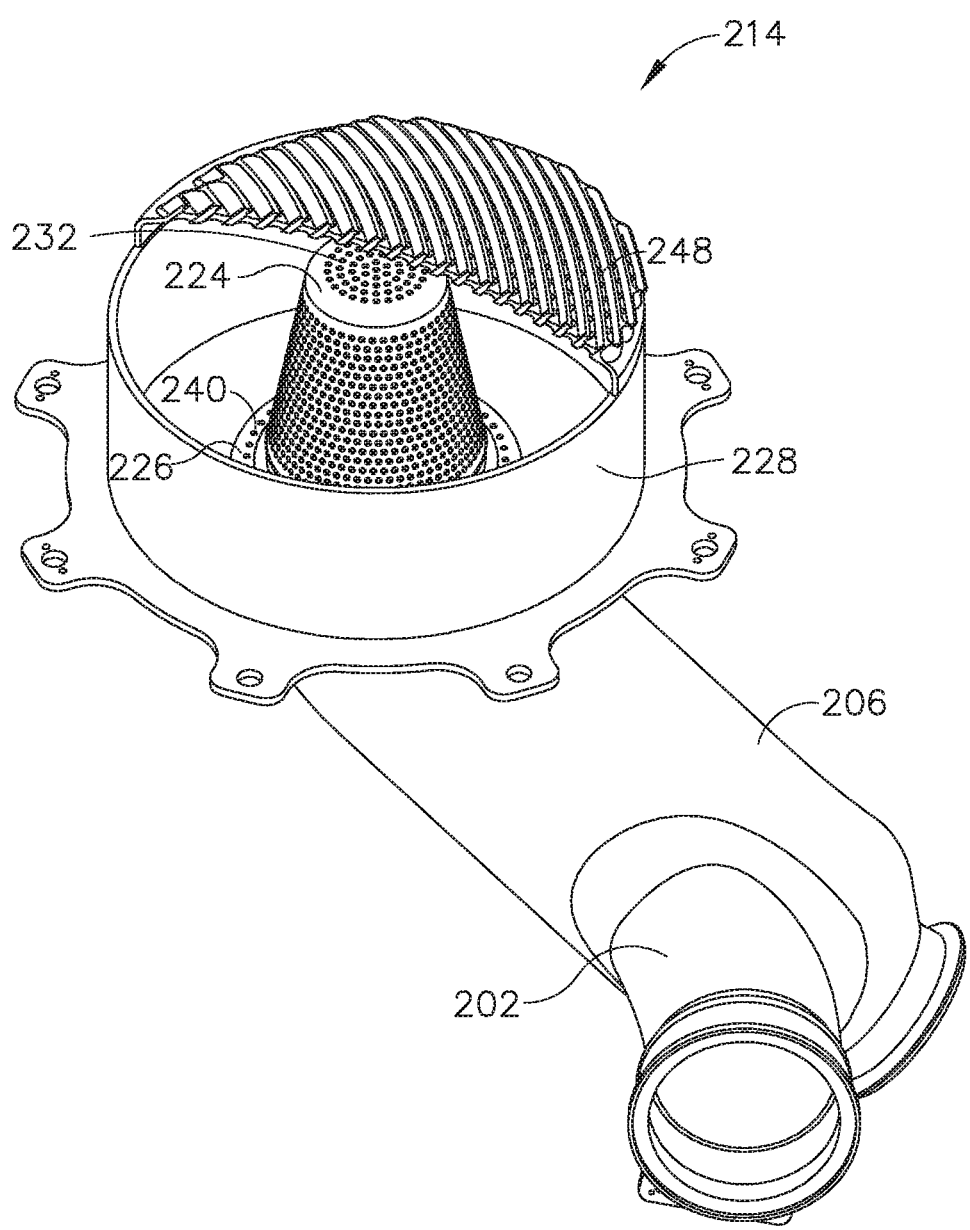
FIG. 3 is a perspective view of an exemplary muffling device isolated from the bleed system shown FIG. 2.
Figure 4:
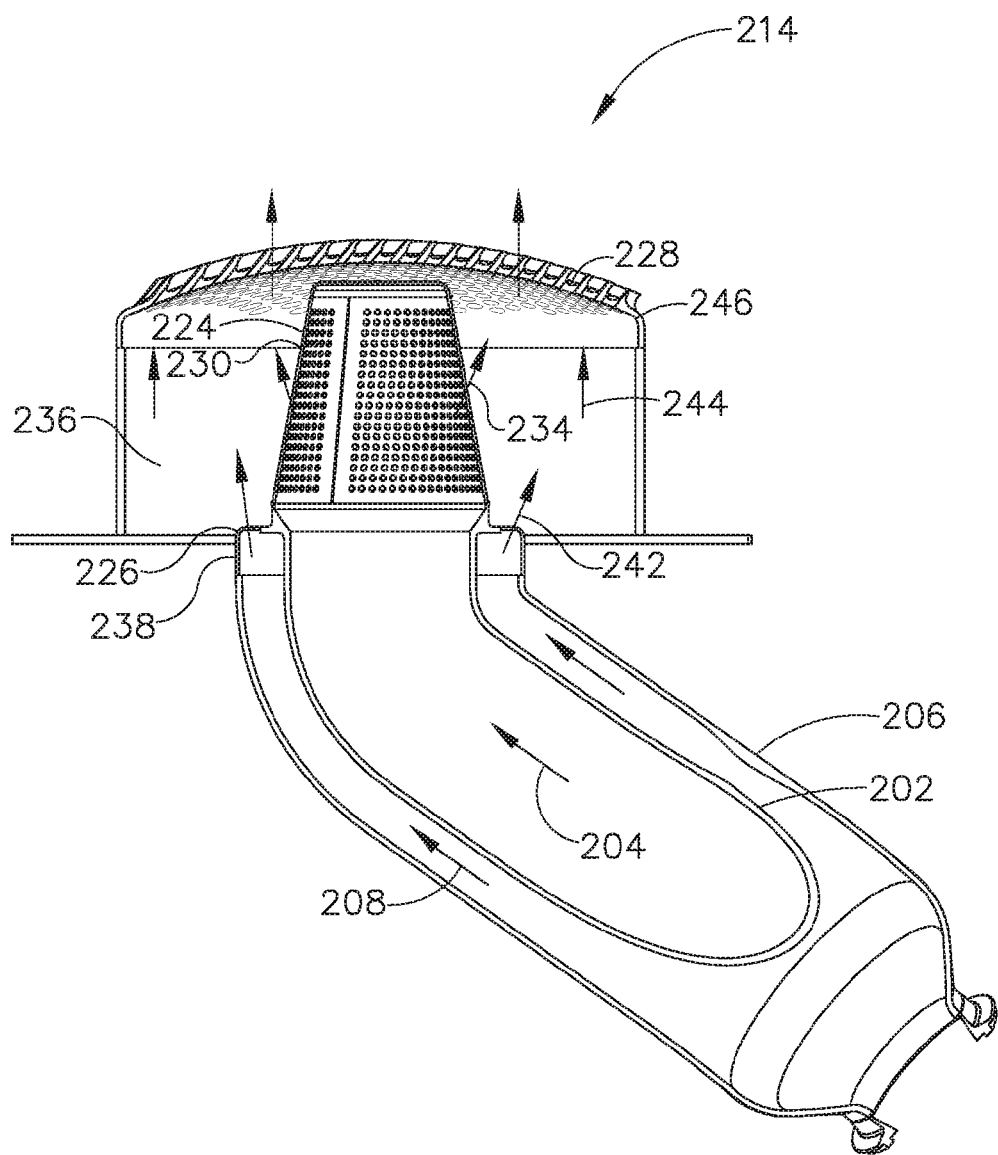
FIG. 4 is a cross-sectional view of the muffling device shown in FIG. 3.

FIG. 3 is a perspective view of an exemplary muffling device 214 that may be used with bleed system 134 (shown in FIG. 2). FIG. 4 is a cross-sectional view of the exemplary muffling device 214. In the exemplary embodiment, muffling device 214 includes an inner first diffuser 224, an inner second diffuser 226, and an outer third diffuser 228 surrounding first diffuser 224 and second diffuser 226. First diffuser 224 is coupled in flow communication with first conduit 202 and downstream of first air flow 204. Additionally, first diffuser 224 includes a body 230 having a substantially frustoconical shape and a plurality of apertures 232 such that first air flow 204 is exhausted 234 into an interior 236 of third diffuser 228. Exhaust first air flow 234 is of lower pressure than first air flow 204. Apertures 232 are positioned on body 230 to direct exhaust first air flow 234 in a direction away from second diffuser 226 such that the higher pressure flow is restricted from blocking and/or back pressuring the lower pressure flow within second conduit 206.

Second diffuser 226 is coupled in flow communication with second conduit 206 and downstream of second air flow 208. Additionally, second diffuser 226 includes a body 238 having a substantially toroid shape, disposed concentrically adjacent to first diffuser 224, and a plurality of apertures 240 such that second air flow 208 is exhausted 242 into interior 236 of third diffuser 228. Exhaust second air flow 242 is of lower pressure than second air flow 208. Apertures 240 are positioned on body 238 to direct exhaust second air flow 242 in a direction away from first diffuser 224 such that the higher pressure flow is restricted from blocking and/or back pressuring the lower pressure flow within first conduit 202.

In the exemplary embodiment, first diffuser 224 and second diffuser 226 maintain separation of first air flow 204 and second air flow 208 until exhaustion within interior 236 of third diffuser 228. Once exhausted within interior 236, exhaust first air flow 234 and exhaust second air flow 242 may mix and combine to form a third air flow 244 that includes exhaust first air flow 234 and exhaust second air flow 242. In the exemplary embodiment, first diffuser 224 extends through second diffuser 226 such that exhaust first air flow 234 from first diffuser 224 is exhausted radially outwardly with respect to exhaust second air flow 242 from second diffuser 226 within interior 236 of third diffuser 228 to reduce the higher pressure flow blocking and/or back pressuring the lower pressure flow. Additionally, in the exemplary embodiment, first and second diffusers 224 and 226 are unitary. In alternative embodiments, first diffuser 224 and second diffuser 226 are separate members that are coupled together.

Third diffuser 228 is disposed within bypass duct 126 and is coupled in flow communication with first diffuser 224 downstream of exhaust first air flow 234 and is coupled in flow communication with second diffuser 226 downstream of exhaust second air flow 242. Additionally, third diffuser 228 includes a body 246 having a substantially cylindrical shape with interior 236 such that third diffuser 228 substantially surrounds first diffuser 224 and second diffuser 226. Moreover, third diffuser 228 includes a plurality of apertures 248 such that third air flow 244 within interior 236 is exhausted 220 into bypass flow 128 within bypass duct 126 (shown in FIG. 2). Exhaust air flow 220 is of lower pressure than third air flow 244 such that the noise from exhaust air flow 220 when entering bypass flow 128 is lowered.

In the exemplary embodiment, muffling device 214 exhausts two bleed air flows, first and second air flows 204 and 208, at a single location 216 within bypass duct 126. Exhausting multiple bleed air flows at a single location 216 reduces the need for individual muffling devices for each bleed air flow and thereby reduces engine weight. In alternative embodiments, muffling device 214 may exhaust any number of bleed air flows, such as, but not limited to, three bleed air flows, four bleed air flows, and five bleeds air flows.

Figure 5:
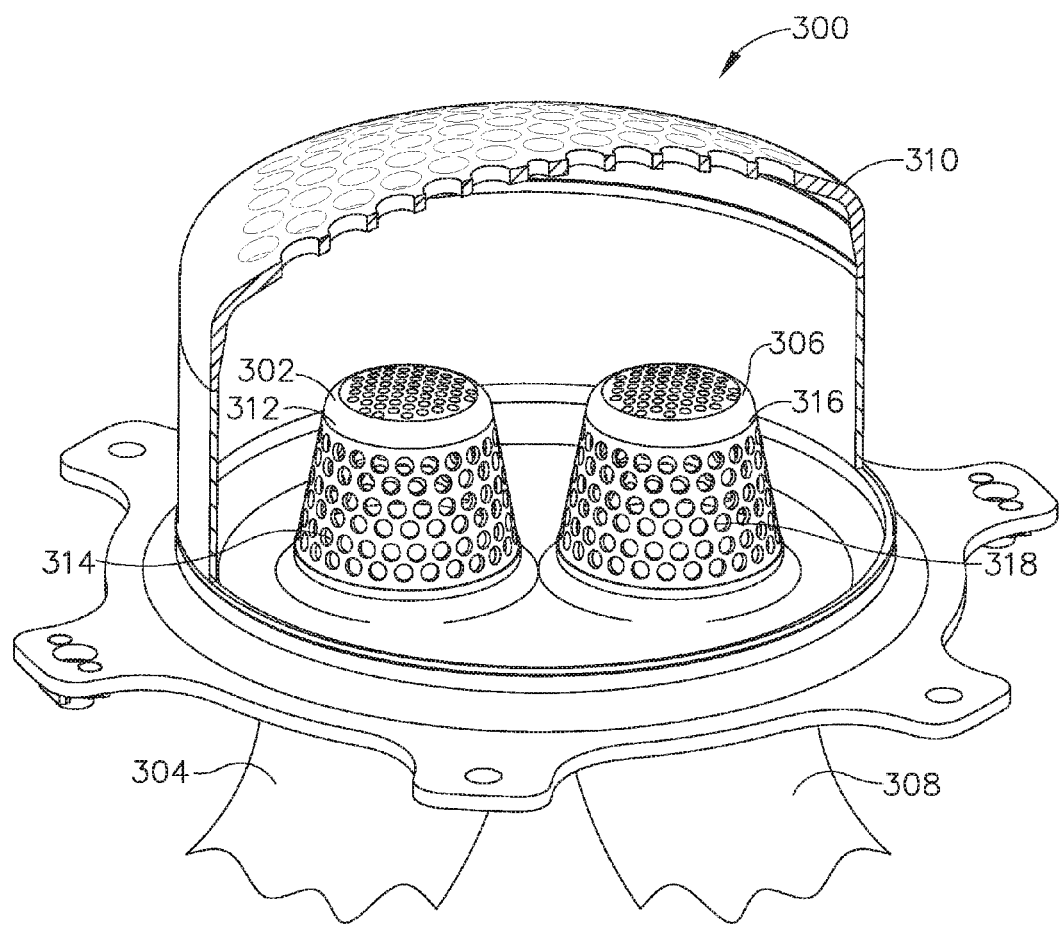
FIG. 5 is a perspective view of another embodiment of the muffling device isolated from the bleed system shown in FIG. 2.

FIG. 5 is a perspective view of another exemplary muffling device 300 that may be used with bleed system 134 (shown in FIG. 2). With reference to FIGS. 2 and 5, the exemplary embodiment of muffling device 300 is substantially identical to the embodiment described above, except as described herein. For example, muffling device 300 includes first diffuser 302 coupled in flow communication with first conduit 304, second diffuser 306 coupled in flow communication with second conduit 308, and third diffuser 310 surrounds first diffuser 302 and second diffuser 306, as described above with respect to the previously described embodiment. However, in this exemplary embodiment, first diffuser 302 is disposed adjacent to second diffuser 306.

In the exemplary embodiment, first diffuser 302 includes a body 312 having a substantially frustoconical shape with a plurality of apertures 314 and second diffuser includes a body 316 having a substantially frustoconical shape with a plurality of aperture 318. In operation, first diffuser 302 and second diffuser 306 maintain separation of bleed air flow such that the higher pressure flow is restricted from blocking and/or back pressure the lower pressure flow within first or second conduits 304 and 308.

The above-described embodiments of the muffling devices provide a cost effective method for exhausting multiple bleed air sources from a multistage compressor of a gas turbine engine. Specifically, the muffling devices and systems described herein allow for multiple bleed air sources to be exhausted at a single location in a bypass duct. The muffling device and system include three concentric diffusers disposed within the bypass duct. The diffusers are configured to induce high pressure drops and desirable flow properties in the exhausted bleed air. A first diffuser exhausts bleed air from a first compressor stage, and a second diffuser exhausts bleed air from a second compressor stage. A third diffuser surrounds the first and second diffuser and further exhausts the bleed air flow into the bypass duct.

An exemplary technical effect of the methods, systems, and apparatus described herein includes at least one of: (a) reducing bleed air exhaust noise within the gas turbine engine; (b) reducing overall system weight while maintaining or improving engine performance; (c) reducing bypass air flow drag within the bypass duct; and (d) reducing part costs for the gas turbine engine.

Exemplary embodiments of methods, systems, and apparatus for muffling devices are not limited to the specific embodiments described herein, but rather, components of the systems and/or steps of the methods may be utilized independently and separately from other components and/or steps described herein. For example, the methods, systems, and apparatus may also be used in combination with other systems requiring air flow noise reduction, and the associated methods, and are not limited to practice with only the systems and methods as described herein. Rather, the exemplary embodiment can be implemented and utilized in connection with many other applications, equipment, and systems that may benefit from air flow noise reduction.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bleed system for exhausting bleed air from a multistage compressor in a gas turbine engine, said system comprising:
   a first conduit coupled in flow communication with a first bleed location on the compressor such that a first fluid flow is directed within said first conduit;
   a first diffuser coupled in flow communication with said first conduit, said first diffuser comprising a body including a plurality of apertures and configured to exhaust the first fluid flow;
   a second conduit coupled in flow communication with a second bleed location on the compressor such that a second fluid flow is directed within said second conduit;
   a second diffuser disposed adjacent said first diffuser, said second diffuser coupled in flow communication with said second conduit, said second diffuser comprising a body including a plurality of apertures, said second diffuser configured to exhaust the second fluid flow within said second conduit; and
   a third diffuser disposed within a bypass duct and at least partially surrounding said first diffuser and said second diffuser, said third diffuser coupled in flow communication with said first diffuser and said second diffuser, said third diffuser comprising a body including a plurality of apertures, said third diffuser configured to exhaust a third fluid flow into a bypass flow within the bypass duct that includes at least one of the first fluid flow exhausted from said first diffuser and the second fluid flow exhausted from said second diffuser.

2. The system of claim 1, wherein said second diffuser body further comprises a substantially toroid shape disposed concentrically adjacent said first diffuser.

3. The system of claim 1, wherein at least a portion of said second conduit is disposed concentrically adjacent said first conduit.

4. The system of claim 1, wherein said third diffuser body further comprises a substantially cylindrical shape.

5. The system of claim 1, wherein at least one of said first diffuser body and said second diffuser body further comprise a substantially frustoconical shape.

6. The system of claim 1, wherein said second conduit comprises a plurality of conduits coupled in flow communication with a plurality of bleed locations on the compressor such that fluid flow is directed within each conduit, and wherein said second diffuser comprises a plurality of diffusers and each diffuser is coupled in flow communication with said corresponding conduit such that fluid flow is exhausted therein.

7. A turbofan engine comprising:
   a core engine comprising a multistage compressor;
   a fan powered by a power turbine driven by gas generated in said core engine;
   a bypass duct at least partially surrounding said core engine and said fan; and
   a bleed system for exhausting bleed air from said multistage compressor to said bypass duct, said bleed system comprising:
      a first conduit coupled in flow communication with a first bleed location on said compressor such that a first fluid flow is directed within said first conduit;
      a second conduit coupled in flow communication with a second bleed location on said compressor such that a second fluid flow is directed within said second conduit;
      a first diffuser coupled in flow communication with said first conduit, said first diffuser comprising a body including a plurality of apertures and configured to exhaust said first fluid flow;
      a second diffuser disposed adjacent said first diffuser, said second diffuser coupled in flow communication with said second conduit, said second diffuser comprising a body including a plurality of apertures, said second diffuser configured to exhaust said second fluid flow within said second conduit; and
      a third diffuser disposed within said bypass duct and at least partially surrounding said first diffuser and said second diffuser, said third diffuser coupled in flow communication with said first diffuser and said second diffuser, said third diffuser comprising a body including a plurality of apertures, said third diffuser configured to exhaust a third fluid flow into a bypass flow within said bypass duct that includes at least one of said first fluid flow exhausted from said first diffuser and said second fluid flow exhausted from said second diffuser.

8. The engine of claim 7, wherein said second diffuser body further comprises a substantially toroid shape disposed concentrically adjacent said first diffuser.

9. The engine of claim 7, wherein at least one of said first diffuser body and said second diffuser body further comprise a substantially frustoconical shape.

10. The engine of claim 7, wherein said first fluid flow and said second fluid flow are different pressures.

* * * * *